United States Patent
Ramakrishnan et al.

(10) Patent No.: US 7,889,654 B2
(45) Date of Patent: *__Feb. 15, 2011__

(54) LOSS TOLERANT TRANSMISSION CONTROL PROTOCOL

(75) Inventors: Kadangode K. Ramakrishnan, Berkeley Heights, NJ (US); Shivkumar Kalyanaraman, Niskayuna, NY (US); Vijaynarayanan Subramanian, Troy, NY (US); Omesh Tickoo, Hillsboro, OR (US)

(73) Assignees: AT&T Intellectual Property II, L.P., Reno, NV (US); Rensselaer Polytechnic Institute, Troy, NY (US)

( * ) Notice: Subject to any disclaimer, the term of this patent is extended or adjusted under 35 U.S.C. 154(b) by 833 days.

This patent is subject to a terminal disclaimer.

(21) Appl. No.: 11/290,809

(22) Filed: Dec. 1, 2005

(65) Prior Publication Data

US 2006/0251011 A1 Nov. 9, 2006

Related U.S. Application Data

(60) Provisional application No. 60/666,398, filed on Mar. 30, 2005.

(51) Int. Cl.
*G06F 11/00* (2006.01)
(52) U.S. Cl. .................. 370/231; 370/216; 370/230; 714/752; 714/776
(58) Field of Classification Search ......... 370/216–218, 370/225, 226, 230, 230.1, 231, 235, 237, 370/242, 243, 253; 714/774, 776, 779
See application file for complete search history.

(56) References Cited

U.S. PATENT DOCUMENTS

| | | | |
|---|---|---|---|
| 5,959,995 A | 9/1999 | Wicki et al. | |
| 5,974,028 A * | 10/1999 | Ramakrishnan | 370/229 |
| 6,097,697 A | 8/2000 | Yao et al. | |

(Continued)

FOREIGN PATENT DOCUMENTS

EP 0 768 806 A2 4/1997

(Continued)

OTHER PUBLICATIONS

Baldantoni, L. et al., "Adaptive End-to-End FEC for Improving TCP Performance Over Wireless Links," IEEE International Conference on Communications, 2004. Jun. 2004. vol. 7, pp. 4023-4027.*

(Continued)

*Primary Examiner*—Donald L Mills
(74) *Attorney, Agent, or Firm*—Toler Law Group

(57) ABSTRACT

Provided are apparatuses and methods for transmitting or receiving data packets in a data block in a communication network with a transport protocol. In one example, a loss tolerant TCP protocol is used in which a maximum segment size (MSS) may be adapted to a minimum granularity of a congestion window. Also, proactive forward error correction (FEC) packets may be added to a window of the data block. The number of proactive FEC packets may be determined, for example, based on an estimate erasure rate. In addition, reactive FEC packets may be added to the data block. Also, a receiver may receive data packets in a data block and process a selective acknowledgment (SACK) responsive to the data packets received.

11 Claims, 14 Drawing Sheets

U.S. PATENT DOCUMENTS

| | | | |
|---|---|---|---|
| 6,169,732 B1 | 1/2001 | Hetherington et al. | |
| 6,189,035 B1 | 2/2001 | Lockhart et al. | |
| 6,208,618 B1 | 3/2001 | Kenney et al. | |
| 6,222,829 B1 | 4/2001 | Karisson et al. | |
| 6,229,808 B1 | 5/2001 | Teich et al. | |
| 6,278,716 B1 * | 8/2001 | Rubenstein et al. | 370/432 |
| 6,389,031 B1 | 5/2002 | Chao et al. | |
| 6,628,629 B1 | 9/2003 | Jorgensen | |
| 6,646,987 B1 * | 11/2003 | Qaddoura | 370/231 |
| 6,882,624 B1 * | 4/2005 | Ma | 370/236.1 |
| 6,937,570 B2 | 8/2005 | Bhatt et al. | |
| 6,947,435 B1 | 9/2005 | Chikuma et al. | |
| 6,961,327 B2 | 11/2005 | Niu | |
| 6,961,697 B1 | 11/2005 | Kapilow | |
| 7,020,083 B2 * | 3/2006 | Garcia-Luna-Aceves et al. | 370/230 |
| 7,036,069 B2 | 4/2006 | Rey et al. | |
| 7,061,856 B2 * | 6/2006 | Banerjee | 370/216 |
| 7,099,273 B2 * | 8/2006 | Ha et al. | 370/229 |
| 7,111,062 B2 | 9/2006 | Banerjee et al. | |
| 7,133,361 B2 | 11/2006 | Olariu et al. | |
| 7,136,353 B2 | 11/2006 | Ha et al. | |
| 7,162,676 B2 * | 1/2007 | Coleman et al. | 714/752 |
| 7,177,300 B2 | 2/2007 | Murakami et al. | |
| 7,180,871 B1 | 2/2007 | Khaflzov et al. | |
| 7,203,167 B2 | 4/2007 | Meyer et al. | |
| 2002/0085587 A1 | 7/2002 | Mascolo | |
| 2004/0215753 A1 | 10/2004 | Chan et al. | |
| 2007/0165524 A1 * | 7/2007 | Mascolo | 370/230 |

FOREIGN PATENT DOCUMENTS

| | | |
|---|---|---|
| EP | 1 120 932 A1 | 8/2001 |
| GB | 2 216 752 | 10/1989 |
| JP | 11136220 A | 5/1999 |
| JP | 2004254127 A | 9/2001 |
| JP | 2002281078 A | 9/2002 |
| JP | 2002330118 | 11/2002 |
| JP | 2003032316 | 1/2003 |
| JP | 2003174478 A | 6/2003 |
| WO | WO 01/37480 | 5/2001 |
| WO | WO 2005046125 A1 * | 5/2005 |

OTHER PUBLICATIONS

Bakin, D.S. et al., "Quantifying TCP Performance Improvements in Noisy Environments Using Protocol Boosters," Fifth IEEE Symposium on Computers and Communicaitons, 2000. ISCC 2000. pp. 92-97.*

Omesh Tickoo, et al., "LT-TCP: End-to-End Framework to Improve TCP Performance over Networks with Lossy Channels," International Federation for Information Processing, 2005.

Partial European Search Report (R. 46 EPC) from the European Patent Office for EP Application No. 06111083.9-2415 dated Jun. 2, 2006, 5 pages.

Extended European Search Report from the European Patent Office for EP Application No. 06111083.9-2415 dated Jul. 28, 2006, 13 pages.

Communication Pursuant to Article 94(3) EPC from the European Patent Office for EP Application No. 08170536.0-2415/2037615 dated Jun. 10, 2009, 5 pages.

Extended European Search Report form the European Patent Office for EP Application No. 08170536.0-2415 dated Feb. 11, 2009, 8 pages.

Communication Pursuant to Article 96(1) and Rule 51(1) EPC and reference to Article 79(2) EPC from the European Patent Office for EP Application No. 06111083.9-2415 dated Oct. 6, 2006, 14 pages.

Hiroyuki Nagao, et al., "Quantifying Control of Layered Streaming using Multiple Error Correction Methods," published by Information Processing Society of Japan on Jan. 28, 2004, vol. 2004 No. 8, pp. 37-42, 2004-QA1-10 (particularly, refer to the "2.2.1 Forward Error Correction: FEC" section).

Chadi Barakat, "Bandwidth Tradeoff between TCP and Link-Level FEC" Computer Networks 2001.

D.S. Bakin, et al., "Quality TCP Performance Improvements in Noisy Environments using Protocol Boosters," Computers and Communications, 2000. Proceedings. ISCC 2000. Fifth IEEE Symposium on pp. 92-97.

Non-Final Office Action from U.S. Appl. No. 11/290,810, mailed Oct. 1, 2008, 9 pages.

Office Action from Japanese Application No. 2006-82131, mailed Oct. 8, 2008, 9 pages.

* cited by examiner

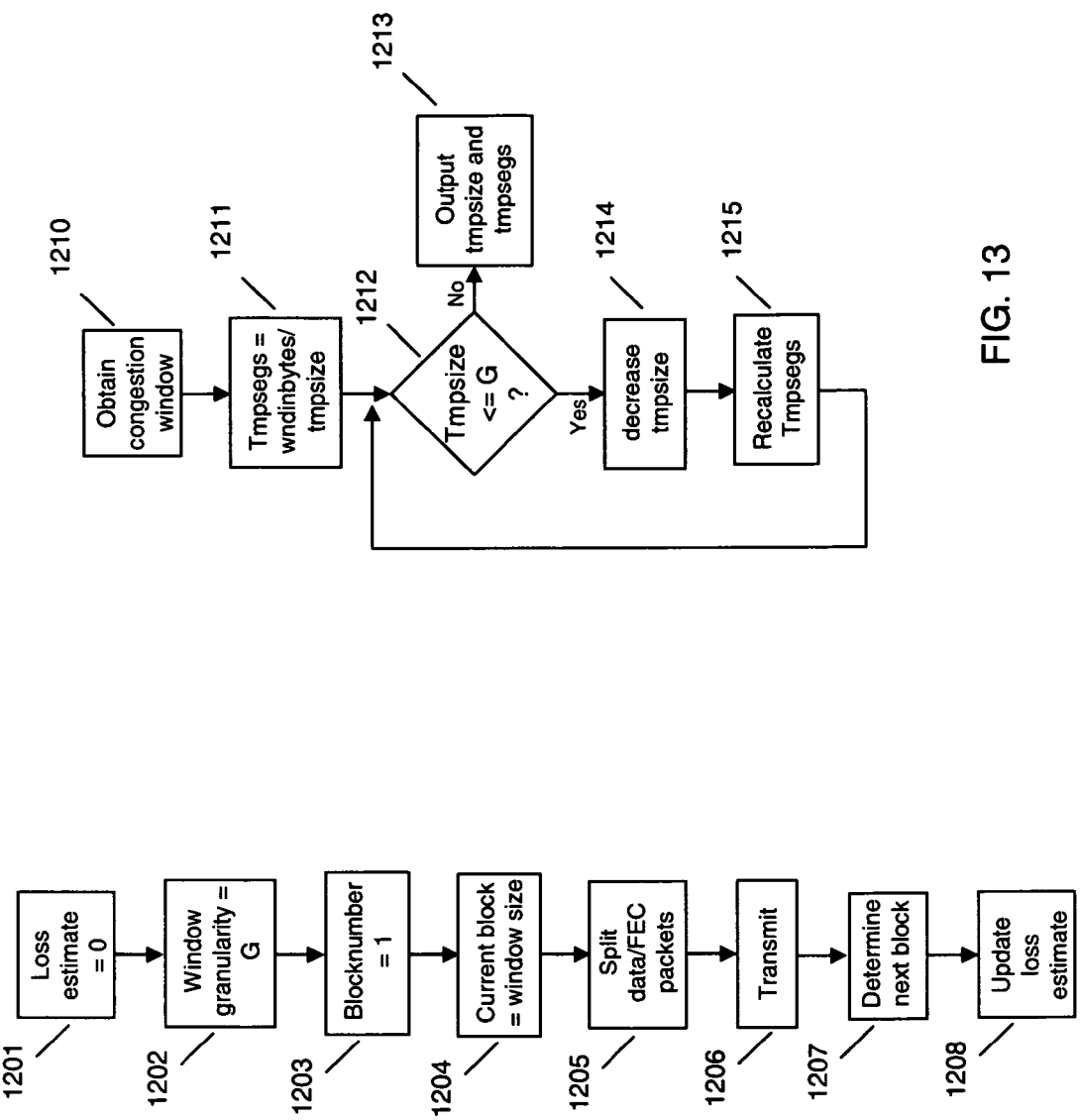

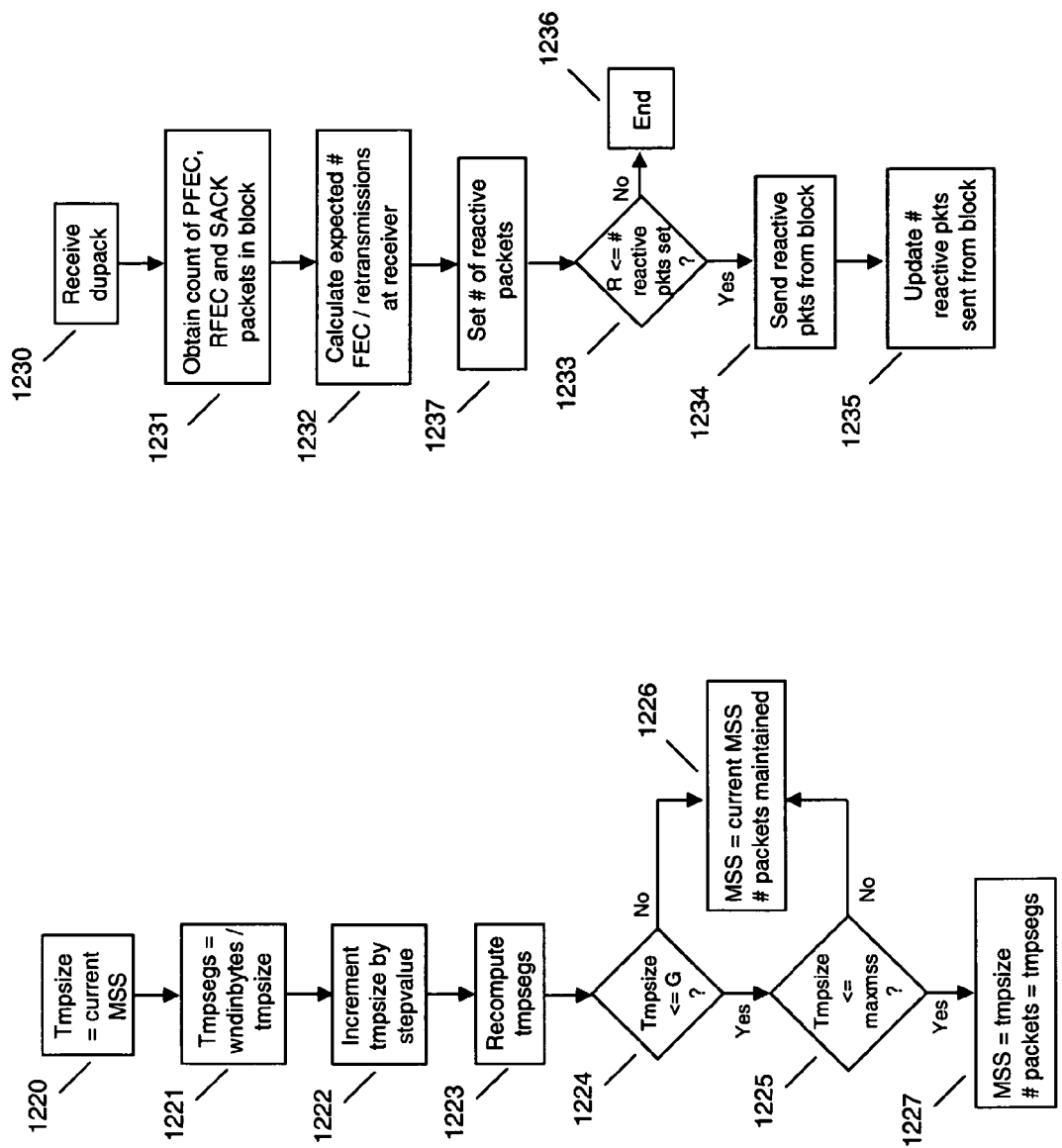

LOSS TOLERANT TRANSMISSION CONTROL PROTOCOL

This application claims the benefit of U.S. Provisional Application Ser. No. 60/666,398, filed Mar. 30, 2005, which is incorporated herein in its entirety.

FIELD OF THE INVENTION

The invention relates generally to communication networks. More specifically, the invention provides for improved communication performance over lossy links.

BACKGROUND OF THE INVENTION

Data communication over wireless channels has become increasingly common. For example, WiFi is used for wireless communication for connections based on the IEEE 802.11 standard. Many other wireless channels may be used such as WiMAX, 3G, mesh networks, or community networks, to name a few. Wireless channels may be lossy such that data may often be lost during transmission due to any one of a variety of conditions. For example, weather conditions may be such that the transmission of communication data may be impaired. Likewise, there may be interference to data transmission from a variety of causes such as interference from other devices transmitting on the same channel. Any of these factors may contribute to additional loss in data packet transmission or increased data packet erasure rates.

In end-to-end transport protocols (e.g., Transmission Control Protocol (TCP)) data communication is provided across interconnected networks or devices. In such transport protocols, of which TCP is one example, data to be transmitted is broken into packets of data. The data packets are transmitted to a receiver where the packets are verified and reassembled into the original message. An acknowledgement (ACK) is returned from the receiver to indicate that the data packets were received. If an ACK is not returned, the data packet may have to be re-transmitted. In addition, when the sender does not receive the ACK within a specified period of time, the transport protocol at the sender may timeout. This results in a reduced rate of transmission of packets as the transport protocol interprets the lack of an ACK as congestion in the network. Then, the data packets may be re-transmitted by the transport protocol at the sender.

TCP, being one example of an end-to-end transport protocol, has become the dominant transmission protocol in use. However, TCP also suffers performance degradation, particularly in wireless links due to such problems as high bit error rates, packet erasure, or intermittent connectivity. In addition, data packet erasures and loss may negatively impact performance through TCP timeouts. Such problems are found in other transport layer protocols as well (e.g., UDP, integrated with media streaming or VoIP, or any wireless link-layer design). Congestion may occur in a network when an amount of traffic on a communication link or path exceeds the capacity of the link or path. In such cases, excess data may be discarded or excess data may be buffered until congestion eases. If congestion persists, however, the congestion is controlled by discarding data packets in the buffer to clear the buffer in a packet-switched network.

TCP is typically used for congestion control in the event of packet loss. However, when data packet loss is not due to congestion (e.g., packet loss due to packet erasure or loss of packets in a lossy wireless link), TCP performance may suffer from unnecessary congestion control. Such congestion control may cause TCP to underestimate capacity which results in a reduction of the congestion window and underutilization of available capacity. TCP suffers substantial performance degradation with long latency channels that even have only a 1% residual error rate. The confusion between congestion and non-congestive loss exists for other transport protocols as well.

Moreover, channel impairments or interference may also result in signal to noise ratio (SNR) degradation and bit errors which may in turn result in packet errors or erasures.

Thus, there exists a need for a method and system for reducing performance loss in a wireless communication network and enhancing transport layer protocol performance in lossy communication channels due to misinterpretation of the loss as being related to congestion. There is also a need for a method and system to adapt data segment size to increase network resiliency to bit or packet erasures.

SUMMARY OF THE INVENTION

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the more detailed description below.

In one example of the present invention, a method is provided for transmitting data packets in a data window with a transport protocol. In one example, the window granularity may be determined or adjusted based on a Maximum Segment Size (MSS).

In yet another example, a number of proactive Forward Error Correction (FEC) packets may be determined and added to the data window and the ratio of the FEC packets to data packets in the data window may be determined.

In another example, the MSS may be adapted to accommodate the proactive FEC packets at a determined window granularity.

In another example, a method is provided for creating a data block. In one example of creating a data block, a number of data packets and FEC packets are included in a data window. In another example, the ratio of FEC packets to data packets is adjusted. In one example, the ratio is adjusted based on an estimated loss rate.

In another example, a transport protocol may reduce the congestion window when an Explicit Congestion Notification (ECN) is received. For example, the response to ECN may provide a distinction between congestion and erasure loss. In another example, on receiving an ECN, the size of the window in bytes may be reduced for different data/FEC parameters in subsequent blocks/windows.

In another example, a method is provided for adjusting window granularity based on a maximum packet size. In another example, minimum packet size is used.

In another example, a method is provided for adjusting window granularity based on a current Maximum Segment Size (MSS).

In another example, a method is provided for transmission of reactive packets.

In another example, a method is provided decoding a packet at a receiver.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 12 is a flowchart illustrating another example of a method of transmitting data and/or FEC packets in a data block in which one or more illustrative embodiments of the invention may be implemented.

FIG. 13 is a flowchart illustrating one example of obtaining or adjusting window granularity in which one or more illustrative embodiments of the invention may be implemented.

FIG. 14 is a flowchart illustrating another example of obtaining or adjusting window granularity in which one or more illustrative embodiments of the invention may be implemented.

FIG. 15 is a flowchart illustrating an example of the transmission of reactive FEC packets in which one or more illustrative embodiments of the invention may be implemented.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

Figure 1:
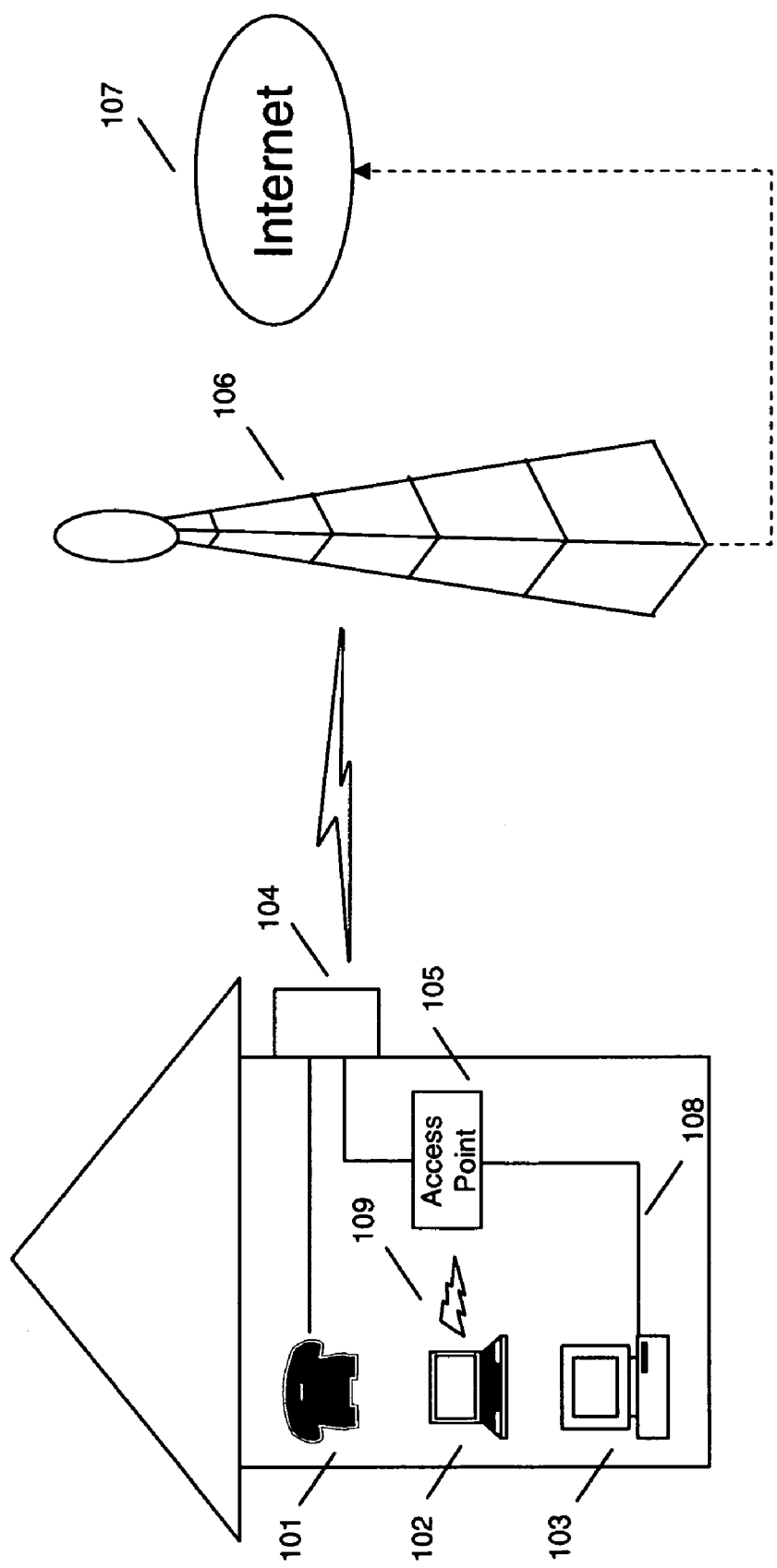
FIG. 1 illustrates an example of a network in which various aspects of the present invention may be implemented.

FIG. 1 illustrates an example of a communication system in which the present invention may be implemented. In this example, data may be communicated over wireless channels. For example, data may be transmitted from a user device such as a telephone 101, a laptop computer 102, a desktop computer 103, or any other device capable of transmitting data. In one example, devices at a customer premise such as a home, business or hotspot, may communicate data via an internal access point 105. In the example illustrated, a laptop computer 102 communicates via a wireless connection 109 with an access point 105 at the customer premise. Likewise, a desktop computer 103 communicates via an Ethernet connection 108 with the access point 105. The access point 105 in this example may also communicate with a subscriber station 104.

As FIG. 1 illustrates, the subscriber station 104 may transmit or receive data via a wireless connection with a base station 106. The wireless station may be any variety of wireless channels. Some examples of wireless channels include WiFi, WiMAX, 3G, mesh networks, community wireless networks, satellite networks, or other wireless channels for data communication including end-to-end communication involving traversal of multiple wireless links, to name a few. The base station 106 may further communicate, for example through a fiber network, with a network such as the internet 107.

A transport protocol may be used as a transport layer for data communication over wireless channels. The present invention may be applicable to any transport layer protocol including, for example, Transport Control Protocol (TCP) or any non-TCP transport protocol such as multimedia streaming via RTP over UDP, custom transport protocols (e.g., NASA's satellite networks), signaling protocols such as SCTP, etc. The present description will refer to TCP as one example of a transport layer protocol in the present invention. However, it is understood that any transport protocol may be used.

Figure 2A:
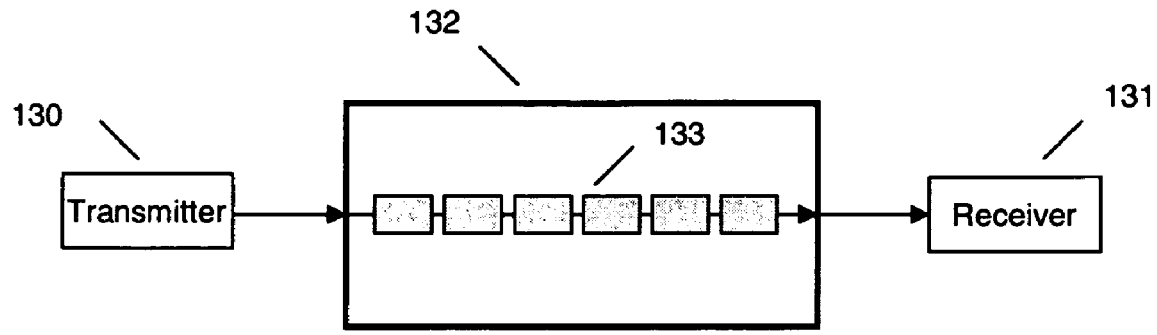
FIGS. 2A-2C are block diagrams illustrating an example of data packets transmitted in a data block with adaptive channel capacity in which one or more illustrative embodiments of the invention may be implemented.
Figure 2B:
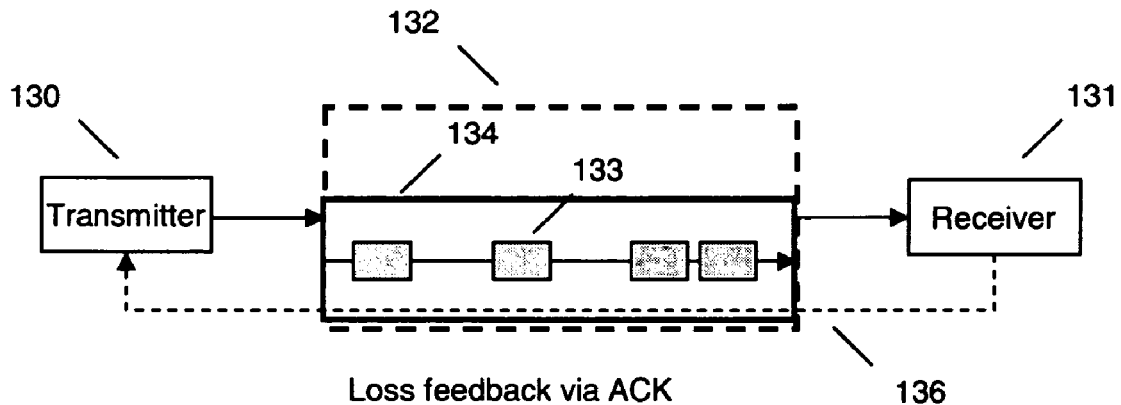
Figure 2C:
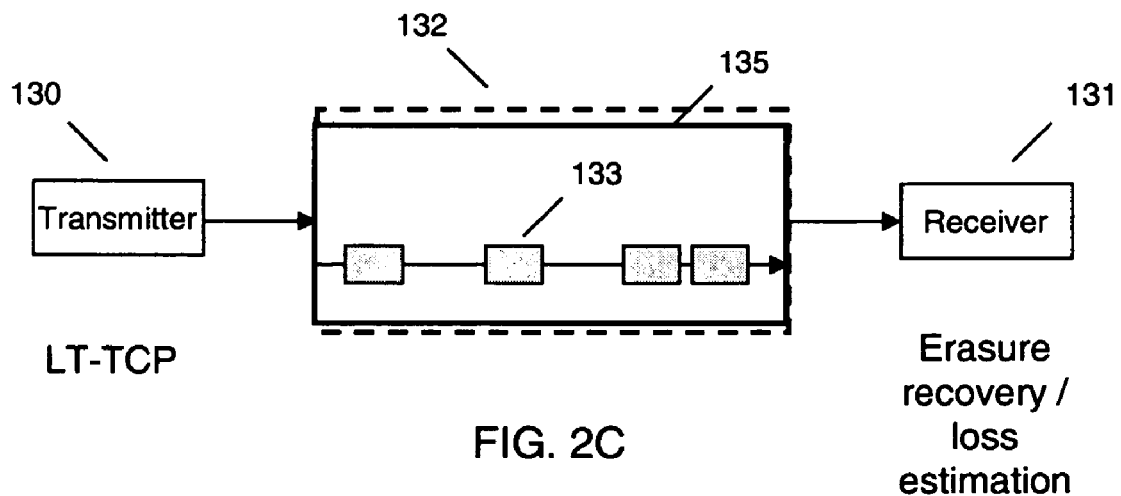

TCP usually responds to congestion in the network by reducing the congestion window in response to a loss of packet data. For example, if congestion occurs, data may be stored in a buffer for later transmission at a time when congestion eases. Thus, when congestion is present, TCP may respond by estimating a lower capacity of the network and reducing the congestion window accordingly. FIGS. 2A-2C illustrate an example of TCP performance during congestion in a communication network. FIG. 2A illustrates a transmitter 130 that transmits data to a receiver 131. The data being transmitted is in the form of data packets 133 that may be transmitted over a channel at a particular bandwidth capacity 132. Data packets may also be referred to as data segments. FIG. 2B illustrates data communication in one example in which there is congestion in the network. In this example, the transmitter 130 transmits data packets 133 to receiver 131. However, due to the presence of congestion, data packets are lost in the network. The receiver 131 receives the data packets 133 and sends an acknowledgement (ACK) or selective ACK (SACK) to the transmitter via a feedback loop 136. In this example, data packets have been lost due to congestion. Based on the data packet loss, TCP estimates a lower capacity of the network and adjusts the window to accommodate for the estimated lower capacity due to congestion. The adjusted window 134 reduces the amount of traffic sent into the network per unit time (has diminished bandwidth demand) as compared to the original window 132. Hence based on the loss feedback from the receiver 131, the capacity of the network is assumed to have been reduced and the bandwidth demand on the network by the end system is correspondingly decreased.

FIG. 2C illustrates an example of the present invention in which a transmitter 130 transmits data packets 133 to a receiver 131. Despite the potential loss of data packets due to packet corruption, data packets are transmitted to the receiver 131 at near capacity. As illustrated in this example, the bandwidth capacity of the network 135 is similar to the bandwidth capacity in the absence of congestion 132. The transport layer used in this example is the Loss Tolerant Transmission Control Protocol (LT-TCP) as described herein.

Figure 3:
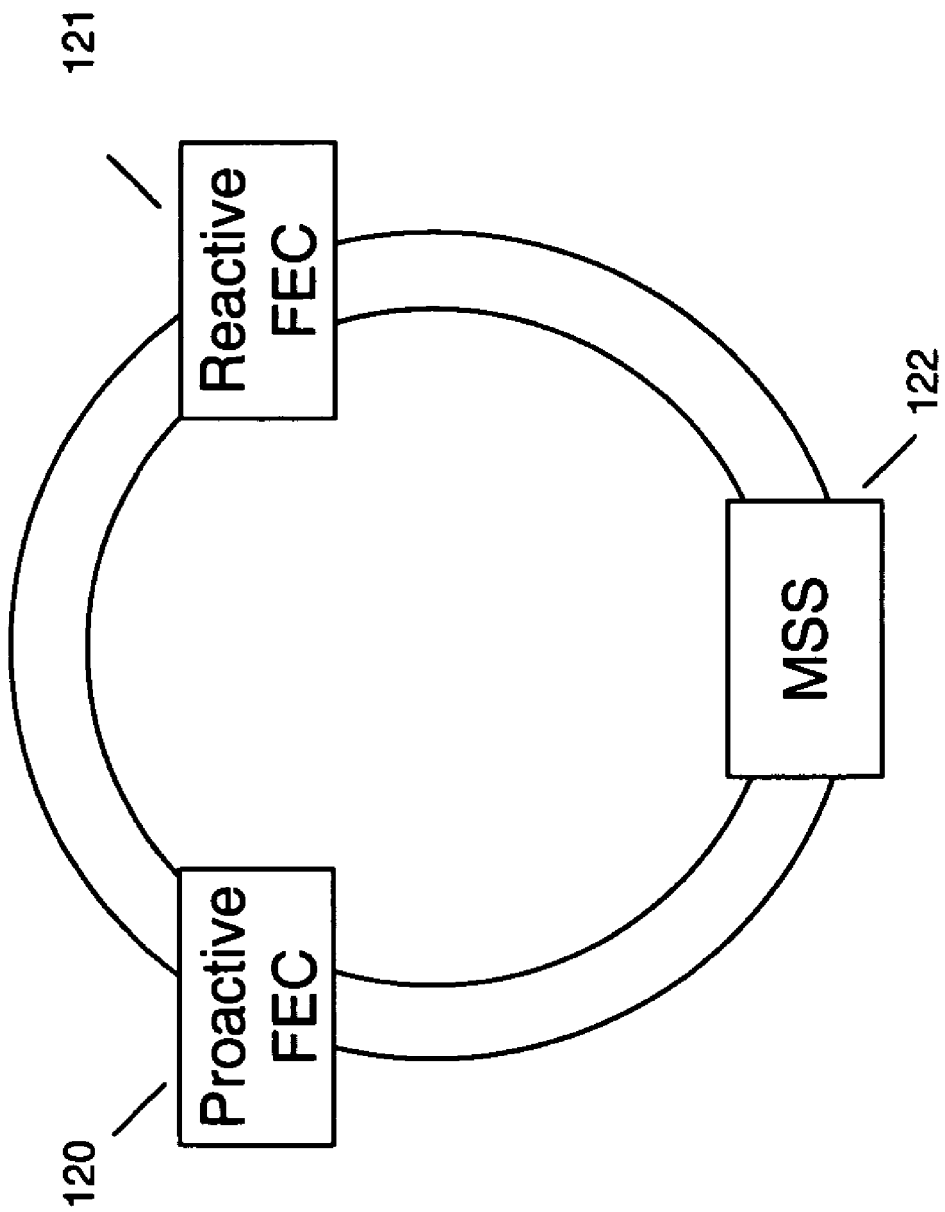
FIG. 3 is a diagram illustrating components of LT-TCP (Loss Tolerant TCP) in which one or more illustrative embodiments of the invention may be implemented.

FIG. 3 is a diagram illustrating an example in which the LT-TCP may include any number of elements. In this example, LT-TCP includes an adaptive maximum segment size (MSS) 122 in which the segment size may be limited, adjusted or otherwise adapted. In one example, the granulation of the congestion window is adjusted to have a number of data packets subject to a predetermined minimum or maximum number. Also, LT-TCP may further include proactive Forward Error Correction (FEC) 120 and/or reactive FEC 121. In calculation of proactive FEC packets, a determined number of FEC packets may be provided proactively prior to transmission. In one example, redundancy is added to the data such that bit errors or packet erasures on the channel are tolerated. Reactive FEC 121 may protect original transmission or retransmissions of TCP as further described below.

Figure 4B:
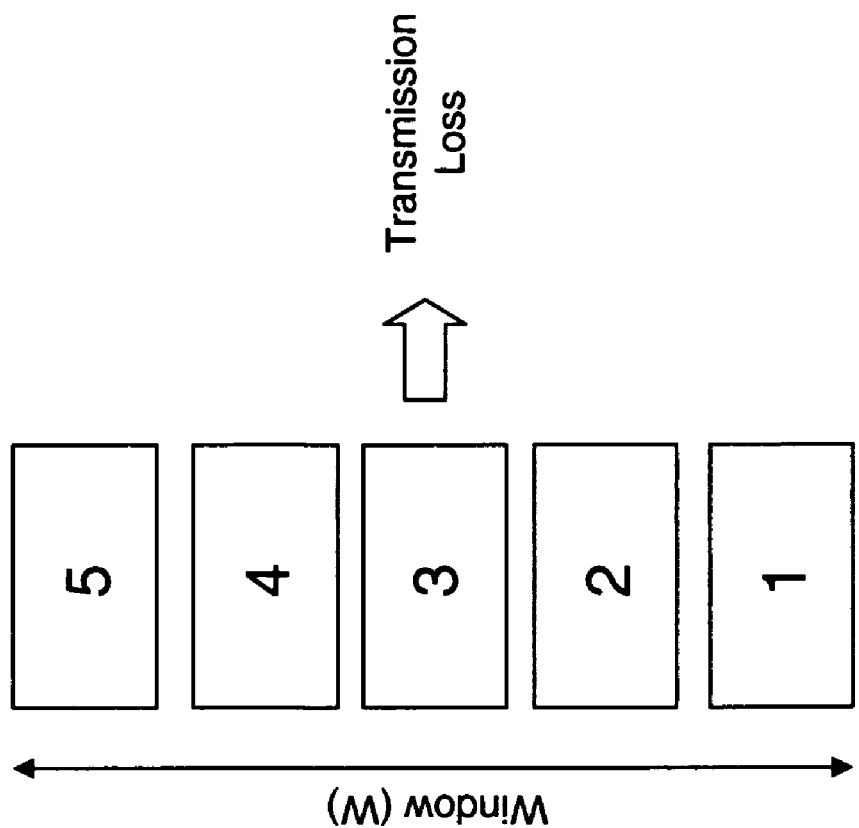
FIG. 4B illustrates an example of total transmission loss.
Figure 4A:
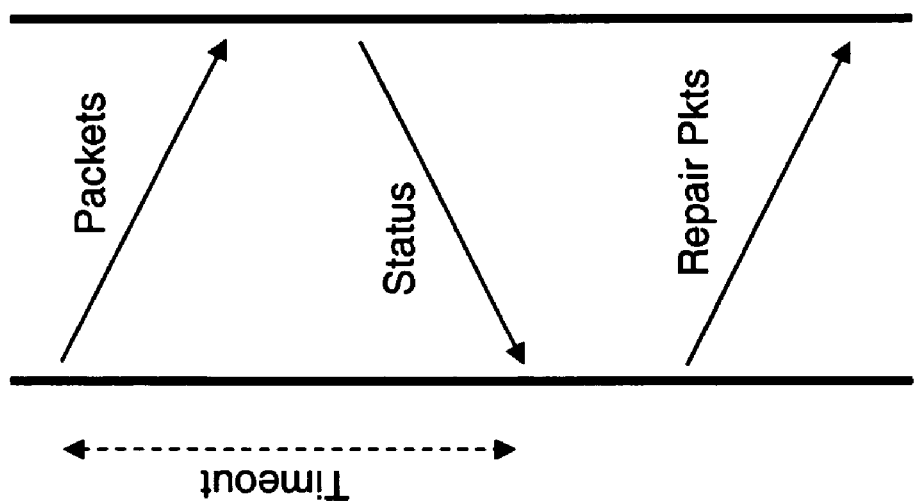
FIG. 4A illustrates an example of transmission of data packets and timeout in which one or more illustrative embodiments of the invention may be implemented.

FIGS. 4A and 4B illustrate an example of transmission loss during data communication. FIG. 4A is a general diagram illustrating the transmission of data packets. In the example illustrated, data packets are transmitted from a sender to a receiver. The packets are received at the receiver which responds by transmitting a status to the sender or transmitter. For example, the status may be an acknowledgement (ACK) that the data packets were received successfully at the receiver. In addition, a plurality of data packets may be acknowledged via selective ACK (SACK) to indicate that some data packets are received while other may not have been received. As one example for illustration purposes, if SACK has a value of: 1110011101, then packets 1, 2, 3, 6, 7, 8, and 10 were received while packets 4, 5, and 9 were not. For example, the SACK may indicate the beginning and end of consecutive bytes that have been received correctly. After the data packets are transmitted from the sender, the sender may wait a designated length of time during a timeout period. The timeout as used in this example is the amount of time the sender waits while expecting the receipt of an acknowledgement (e.g., SACK) from a receiver indicating that the data packets transmitted were received at the receiver intact. If an acknowledgement of a data packet is not received within the allotted timeout period, the transmitted data packet may have been lost. Thus, packet loss may be detected by failure to receive an ACK at the sender from the receiver within the timeout period. In this case, the sender or transmitter may re-transmit the missing data packet. For example, the sender may transmit repair data packets to the receiver.

Another way of detecting data packet loss is through the use of duplicate acknowledgements (dupacks). A dupack may be used to acknowledge a previously received data packet in which an ACK has been previously provided. For example, if a first data packet is received at a receiver from a sender, the receiver may transmit an ACK to the sender to indicate receipt of the first data packet. However, if the next expected second data packet is not received at the receiver, then the receiver does not send an ACK for the second data packet. If the sender transmits and the receiver receives a third data packet, the receiver not having received the second data packet, sends an ACK for the first data packet (i.e., the last data packet that the receiver successfully received). In this case, the second ACK indicating receipt of the first data packet is a duplicate ACK (i.e., dupack) because the dupack re-acknowledges the receipt of the first data packet which was previously indicated. Thus, the receiver may indicate through the use of dupacks that a particular data packet was not received after subsequent data packets are transmitted (i.e., it is a duplicate of a previous ACK). In addition, the dupack may also indicate that a new packet that was out of sequence was received at the receiver. Traditionally, a TCP sender retransmits a packet only when a third dupack is received from the receiver.

FIG. 4B illustrates an example of total loss of data packets in a window that has low window granularity. In this example, the maximum segment size (MSS) is large as each segment or packet within the window is large. This results in low window granularity. As illustrated in this example, the window contains five (5) data packets, data packets 1-5. However, due to a variety of reasons, such as, for example, weather conditions or interference over a wireless link that may be part of the end-to-end network, data packets may be lost during transmission. Because the window of this example has low window granularity (i.e., segments or packets in the window have a high MSS), it is more likely that data packet loss may occur. This is because the larger the maximum segment size, the more likely that total loss of the data packet may occur. In addition, the length of time the impairment in transmission is present on the link (e.g., weather conditions on a wireless link), the more likely that all the data packets in the window are lost. In the example illustrated in FIG. 4B, window granularity is low and all data packets in the window are lost. Hence, the receiver does not return an ACK to the sender and timeout thus occurs at the sender. Typically, a TCP sender responds to a timeout by reducing the window size drastically (e.g., to 1 or 2 packets) and then gradually builds the window back up as packets are successfully transmitted.

In one example of the present invention, a transport protocol, such as but not limited to TCP, treats data packet loss as congestion if an Explicit Congestion Notification signal (ECN) is present in an ECN-capable network path such that an ECN may be generated when congestion is detected locally. Conversely, if an ECN signal is not present in an ECN-capable network path, then the transport protocol does not treat data packet loss as congestion. In this example, a transport protocol (e.g., Loss Tolerant TCP (LT-TCP)) may respond to congestion in a communication network by altering its sending rate or window when an indication, such as the ECN signal, is received that indicates that the network is congested as opposed to data packets being lost for other reasons (such as data loss in a lossy system or packet erasures). In this example, the Explicit Congestion Notification (ECN) may be generated by the network based on the state of the queue in order to indicate congestion in the network. For example, data packets may be marked during congestion in the network by routers in the network by inserting an ECN signal in the header to indicate to the network that congestion exists. Receivers that receive marked data packets may return information regarding the marked data packets and the senders may decrease the transmission rate accordingly. In this case, the transport protocol such as LT-TCP may respond to the congestion because it receives an unambiguous indication of congestion through the ECN marks.

However, when there are no ECN indications received at the receiver, the loss of data packets is not considered to be due to congestion. In this example, other packets successfully received are also not marked with the ECN mark indicating congestion. Therefore, LT-TCP does not respond to congestion but instead treats the packet losses as being due to errors in the network to provide a loss-tolerance response. The loss-tolerance response is further described herein.

Figures 5A, 5B:
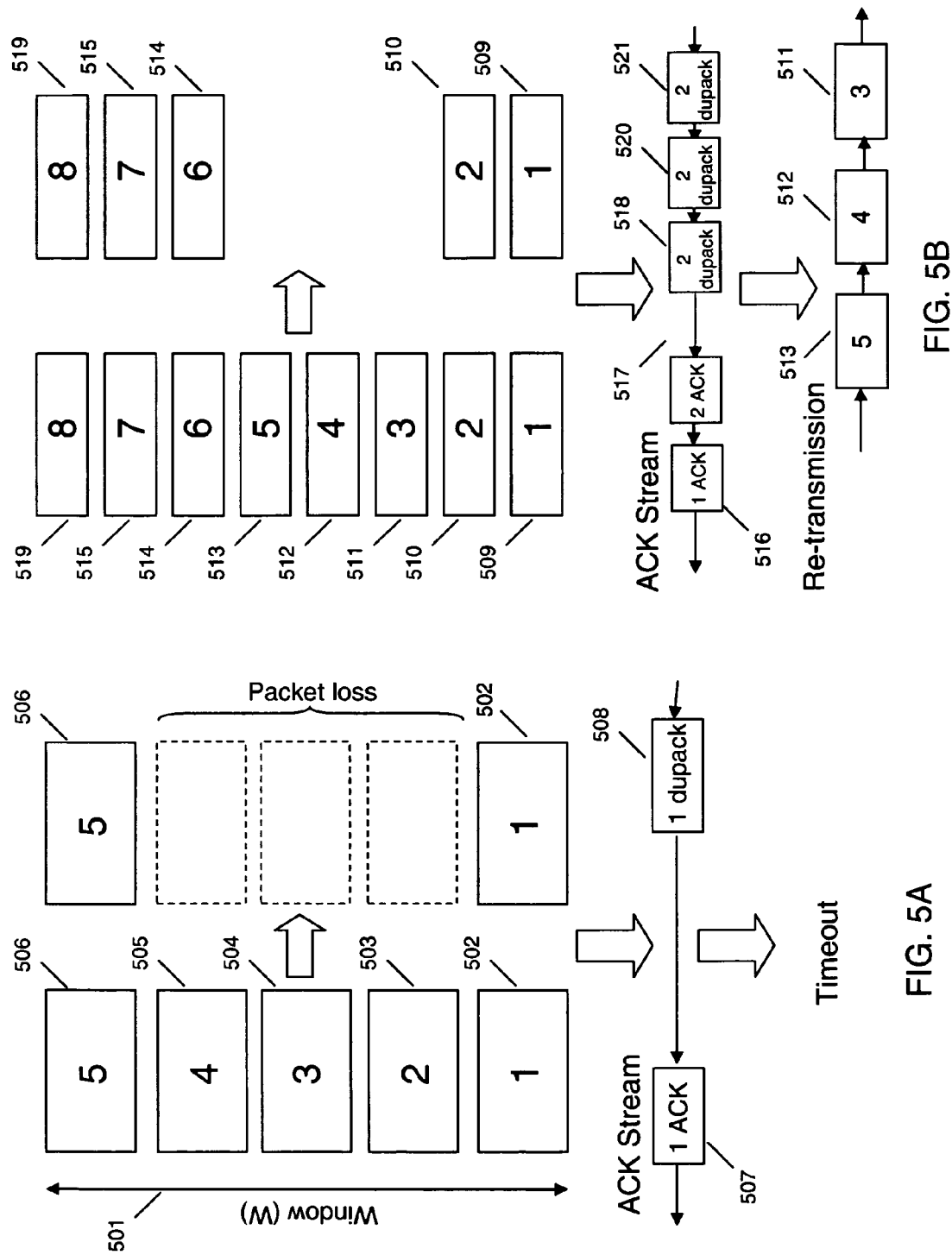
FIGS. 5A and 5B illustrate an example of the effects of window granularity on timeout and re-transmission of data packets in which one or more illustrative embodiments of the invention may be implemented.

In one example of the loss-tolerance response of the transport layer protocol of the present invention in response to network congestion, the maximum segment size and the number of data packets or segments in a window may be adjusted to increase window granulation. FIGS. 5A and 5B illustrate the effects of window granularity on timeout and re-transmission of data packets. FIG. 5A illustrates an example of a window (W) 501 of five (5) data packets: data packet 1 (502), data packet 2 (503), data packet 3 (504), data packet 4 (505) and data packet 5 (506). Each of the five data packets (502-506) in the window 501 are transmitted sequentially over the network from a sender to a receiver. However, due to various conditions on the network (e.g., interference or weather conditions, for example), only data packet 1 502 and data packet 5 (506) are successfully received at the receiver. Data packets 2-4 (503-505) are not received and are thus lost. Hence, when data packet 1 (502) is received at the receiver, the receiver returns an ACK (i.e., 1 ACK 507) to the sender to indicate that data packet 1 (502) was successfully received at the receiver. However, an ACK is not returned for each of data packets 2-4 (503-505) because data packets 2-4 (503-505) are not received. When data packet 5 (506) is transmitted from the sender and received at the receiver, the receiver receives the data packet 5 (506), however, because none of data packets 2-4 (503-505) were successfully received at the receiver, the receiver responds to the receipt of data packet 5 (506) by returning a dupack (508) to the sender. The dupack indicates to the sender that data packets were lost and that the last successfully received data packet was data packet 1 (502). Similarly the packet sent in response to 1 ACK 507, i.e. data packet 6 (not shown) generates a second dupack. However, in the example of FIG. 5A, the window granularity is low (i.e., the size of each data packet or segment is large) and no further dupacks are generated because no further out-of-sequence data packets are allowed in the window. In this example, there are an insufficient number of dupacks received and only one dupack is received at the sender in response to the reception of data packet 5 at the receiver. Therefore, the sender times out while waiting for an ACK on packet 2. Also, there are no other dupacks received. Therefore, an excessive amount of time elapses after the initial ACK responsive to the receipt of data packet 1 (502) was received at the sender. Thus, the sender undergoes timeout to retransmit all the packets starting with data packet 2. Timeout wastes capacity and leads to lower performance.

FIG. 5B illustrates the effect of increased window granularity on transmission of data packets. In this example, as compared to the example illustrated in FIG. 5A, the maximum segment size (MSS) is adjusted such that the size of each of the data fragments or segments within the window is decreased (i.e., window granularity or the number of data packets or segments in the window is increased). In the examples illustrated in FIGS. 5A and 5B, the total number of data bytes in the window is still the same in FIG. 5A and FIG. 5B. In this example, the window (W) 501 includes eight data packets—data packets 1-8 (509-515, 519). The eight data packets 1-8 (509-515, 519) are transmitted sequentially over the network from the sender to the receiver. However, due to conditions such as weather conditions or interference, only data packets 1 (509), 2 (510) and 6-8 (514, 515, and 519) are successfully received at the receiver. Data packets 3-5 (511-513) are lost in transmission. The channel conditions that cause bit errors have a smaller multiplier effect in terms of number of packet losses because the MSS is now smaller.

The receiver returns an ACK for each successfully received data packet or segment. Hence, in the example illustrated in FIG. 5B, the receiver receives data packet 1 (509) and responds by returning ACK 1 (516). The receiver then receives data packet 2 (510) and responds by returning ACK 2 (517). However, because data packets 3-5 (511-513) are each not received at the receiver, the receiver does not return an ACK for any of data packets 3-5 (511-513). Data packets 6-8 (514, 515, 519) are then transmitted from the sender to the receiver. Because in this example the receiver successfully receives data packets 6-8 (514, 515, 519) and not data packets 3-5 (511-513), the receiver responds by returning 3 duplicate acknowledgements (dupacks) for packet 2 (518, 520, 521) when it receives packets 6, 7 and 8 (514, 515, 519). However, because none of data packets 3-5 (511-513) were received at the receiver, the receiver responds to the receipt of data packets 6-8 (514, 515, 519) by returning a dupacks 518, 520, and 521 corresponding to data packet or segment 2 (510) upon reception of each of packets 6, 7 and 8 (514, 515, 519). The dupacks (518, 520, 521) indicate that data packets have been lost and that the last received data packet or segment at the receiver was data packet 2 510 in this example. The additional 3 dupacks (518, 520, 521) are received at the sender. This causes the sender to retransmit packet 3.

Also in the example of FIG. 5B, the window granularity is high (i.e., the number of data segments or packets in the window is high and the size of each of the data packets in the window is small). Therefore, the sender, not having received an ACK for any of data packets 3-5 (511-513), has still not undergone timeout when the three dupacks 518, 520, 521 are received indicating data packet or segment loss in the network. As a result, the sender is able to re-transmit the lost data packets 3-5 (511-513) to the receiver. Thus, in the example illustrated in FIG. 5B, increased window granularity prevents timeout and permits successful transmission and re-transmission of data packets or segments.

In another example, Forward Error Correction (FEC) packets may be used to reconstruct lost data packets. FEC packets may be proactive or reactive. Proactive FEC packets may be created to provide adequate protection against data packet erasure. In one example of proactive FEC packets, a determined number of proactive FEC packets are added to and transmitted in a window with the data packets. The Maximum Segment Size (MSS), which may be subject to minimum and/or maximum values, may also be adjusted or adapted as described herein to provide a proper window granularity as well as to accommodate the FEC packets transmitted with the data packets. Thus, in this example, data packets or segments are transmitted in a window of data packets with a number of FEC packets and the MSS may also be adjusted or adapted to accommodate the FEC packets and/or maintain a desired window granularity.

Figure 6:
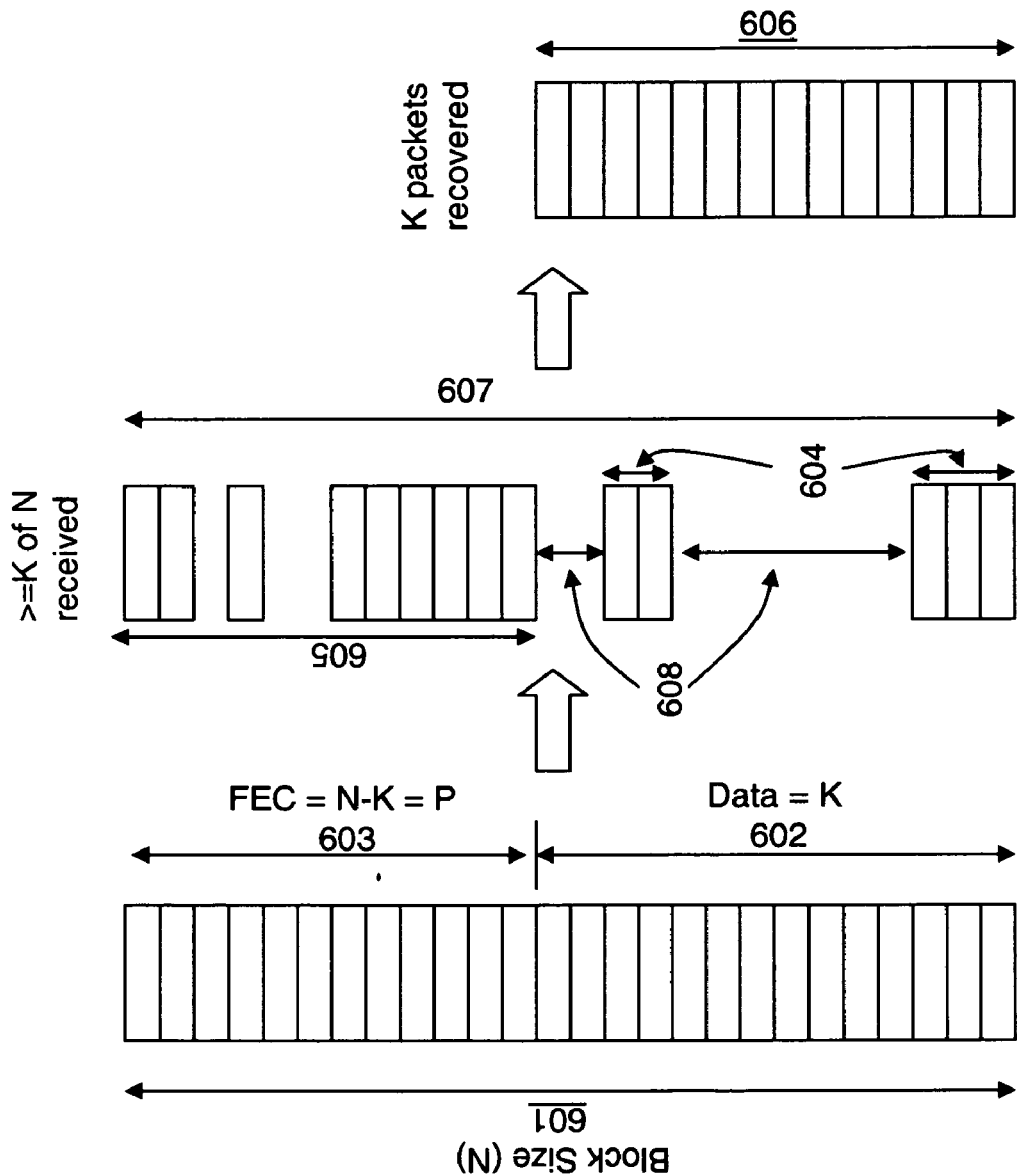
FIG. 6 illustrates an example of recovery of FEC data packets in which one or more illustrative embodiments of the invention may be implemented.

FIG. 6 illustrates an example of recovery of FEC data packets. In this example, a window of packets 601 with a block size of N is transmitted in a data communication network. The N packets 601 include K (where K<N) data packets 602 and P FEC packets 603, where the sum of K data packets 602 and P FEC packets 603 is N packets 601. The communication network of this example may be a lossy system in which data packets are lost during transmission. In this example, a total of K packets 607 are received. Some of the packets 607 received are the original data packets 602 whereas the other packets received may be any of the FEC packets 605. Error correction packets (i.e., FEC packets) in this example permit FEC reconstruction of lost packets. Thus, in this example, it does not matter which data packets are received. An FEC packet (e.g., any one of packets 603) may protect or repair any data packet (e.g., any of data packets 602). Hence, missing data packets 602 (i.e., data packets 608) may be reconstructed with FEC packets received (i.e., data packets 605). This results in K data packets recovered (i.e., data packets 606).

There are many other examples of alternative methods of generating FEC packets. For example, one additional method is to precompute an inventory of FEC packets used for proactive and/or reactive FEC, and use a set of zero-segments to complete a "block" used in traditional block-based FEC encoders. Either Reed-Solomon (RS) codes or other block-based codes can be used. Another method is to compute new FEC packets on the fly as needed for the segments. Any of the class of randomized low-density parity check (LDPC) codes that can be used. In any case the "sequence-agnostic" property of FEC may be used to reconstruct the window because the order does not matter. Also, the transport layer can deliver in-order data segments to the application even as it waits for more FEC packets to reconstruct the block.

Figure 7:
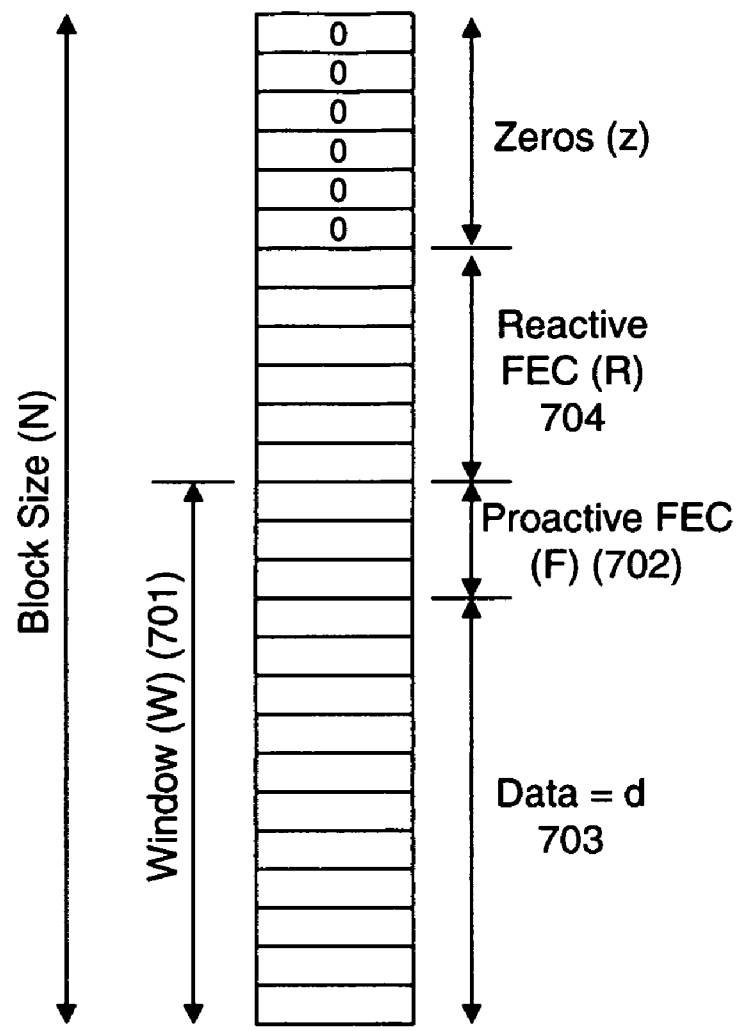
FIG. 7 illustrates an example of a block of data packets including proactive and reactive FECs in which one or more illustrative embodiments of the invention may be implemented.

In addition to proactive FEC packets, FEC packets may also be reactive. Reactive FEC packets may be provided and transmitted in response to data packet loss. For example, reactive FEC packets may be used in response to dupacks from a receiver. FIG. 7 illustrates an example of a block of data packets including proactive and reactive FEC packets. As FIG. 7 illustrates, a Window (W) 701 contains data packets which includes proactive FEC (F) packets 702 and data packets 703 which may be transmitted from a sender to a receiver. However, if data packets are lost during transmission, the receiver fails to receive all of the transmitted data packets and the transmitter does not receive a corresponding ACK from the receiver. In response, the transmitter may transmit a corresponding number of reactive FEC packets 704 to the receiver. Hence, reactive FEC data packets may complement and protect retransmissions that are sent in response to SACKs. The reactive FEC packets may serve to repair the original transmissions or the retransmissions that are lost.

Figure 8:
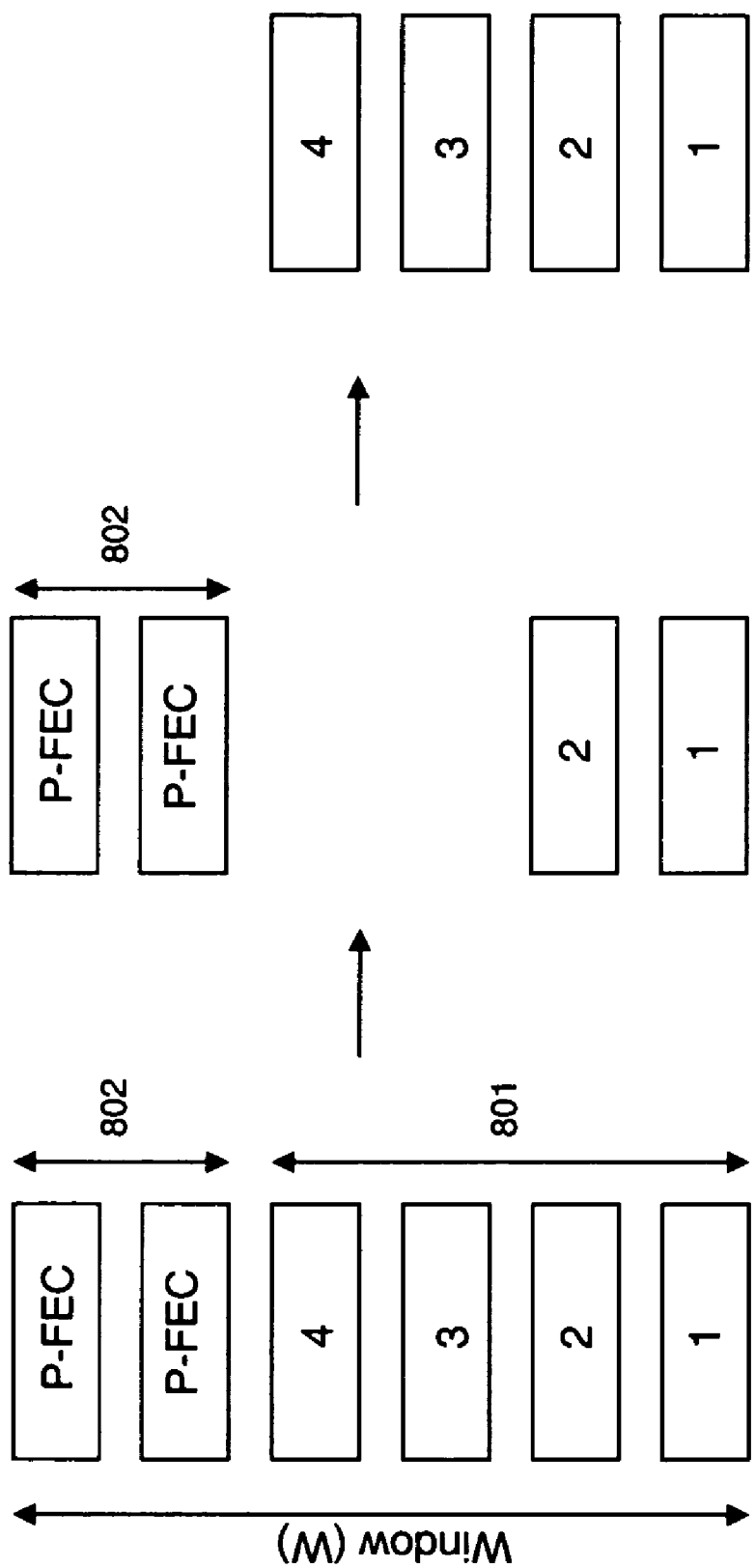
FIG. 8 is an example of proactive FEC data packets in a transmission in which one or more illustrative embodiments of the invention may be implemented.

FIG. 8 illustrates an example of proactive FEC data packets in a transmission. In this example, a window (W) of data packets contains four data packets 801 (data packets 1-4) and two proactive FEC packets 802. During transmission, however, data packets 3 and 4 are lost. This may be due to, for example, interference or weather conditions. However, proactive FEC packets 802 are successfully transmitted. Hence, the two transmitted proactive FEC packets 802 are used to reconstruct the lost data packets. This results in successful transmission of all of the data packets (i.e., data packets 1-4 in this example) without the use of dupacks.

Figure 9:
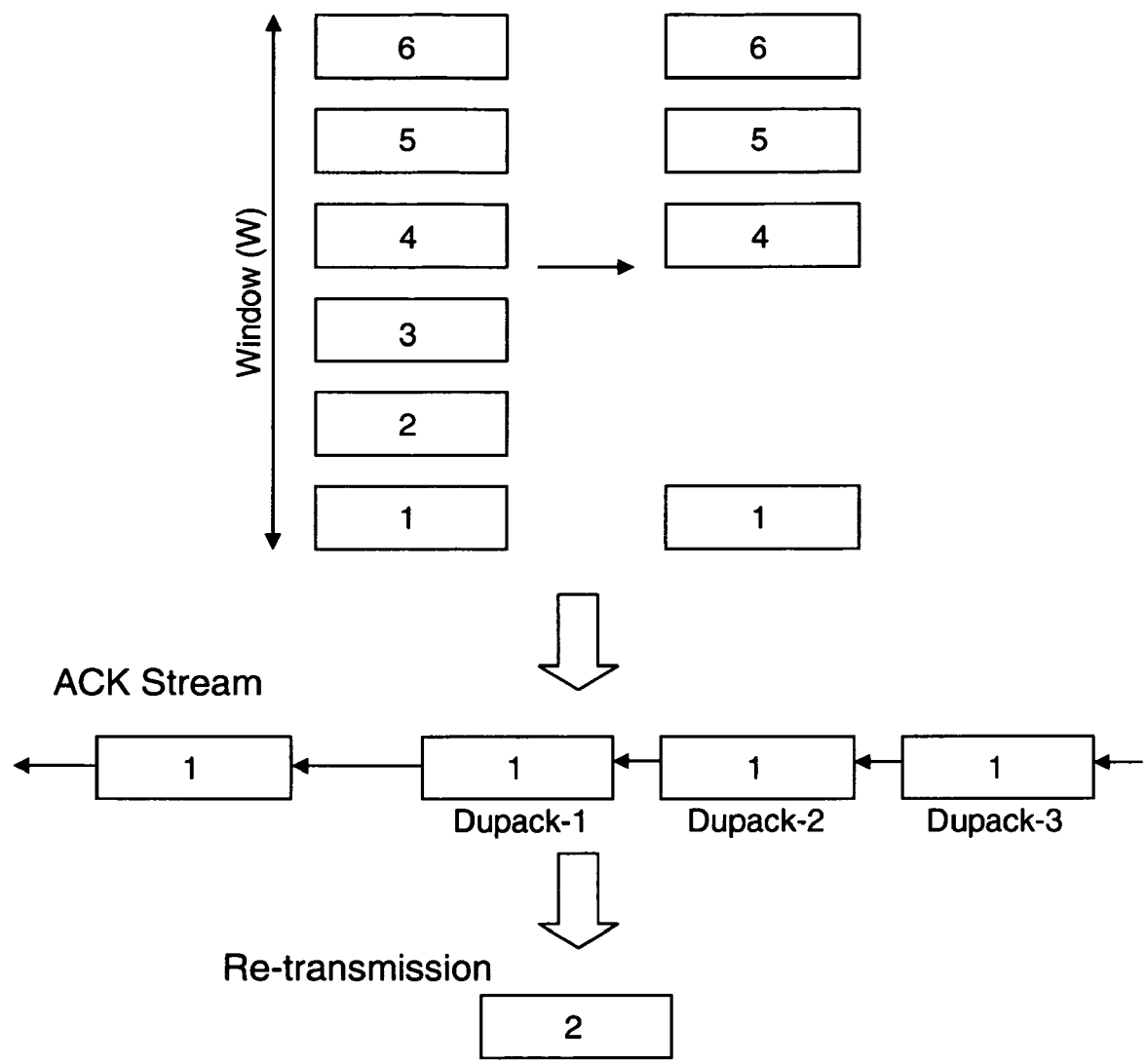
FIG. 9 is an example of re-transmission of lost data packets in which one or more illustrative embodiments of the invention may be implemented.

FIG. 9 illustrates an example of re-transmission of lost data packets. In this example, a window of data packets contains six data packets (i.e., data packets 1-6). However, during transmission, some data packets may be lost. In this example, data packets 2 and 3 are lost during transmission. Hence, a receiver may receive data packet 1 but fail to receive data packets 2 and 3. In this example, the receiver sends an ACK to the transmitter responsive to receiving data packet 1. However, data packets 2 and 3 are not received at the receiver in this example. Thus, the receiver does not return an ACK for either of data packets 2 or 3. When data packet 4 is received at the receiver, the receiver has not received data packets 2 or 3. Therefore, the receiver returns a dupack responsive to receiving data packet 4. The dupack indicates that data packet loss has occurred and that the last successfully receive data packet was data packet 1. In addition, the receiver may further send the dupack in response to each data packet subsequently transmitted by the transmitter and received by the receiver until a retransmission of data packet 2 is received. As illustrated in FIG. 9, three dupacks are returned in the ACK stream to the transmitter, responsive to receiving data packets 4, 5, and 6, respectively. The transmitter retransmits data packet 2 to the receiver responsive to the dupacks and the receiver may acknowledge the retransmitted data packet 2 by sending a corresponding ACK.

However, in many cases, the retransmitted data packet may itself be lost during transmission. In this example, if retransmitted data packet 2 is also lost before being successfully received at the receiver, the receiver may continue to transmit dupacks to the transmitter until the transport protocol undergoes timeout. During the timeout period, no packets are transmitted by the sender, and data packet 2 will be retransmitted at the end of the timeout period. The timeout period can be substantial, and can thus result in a significant loss of throughput.

Figure 10:
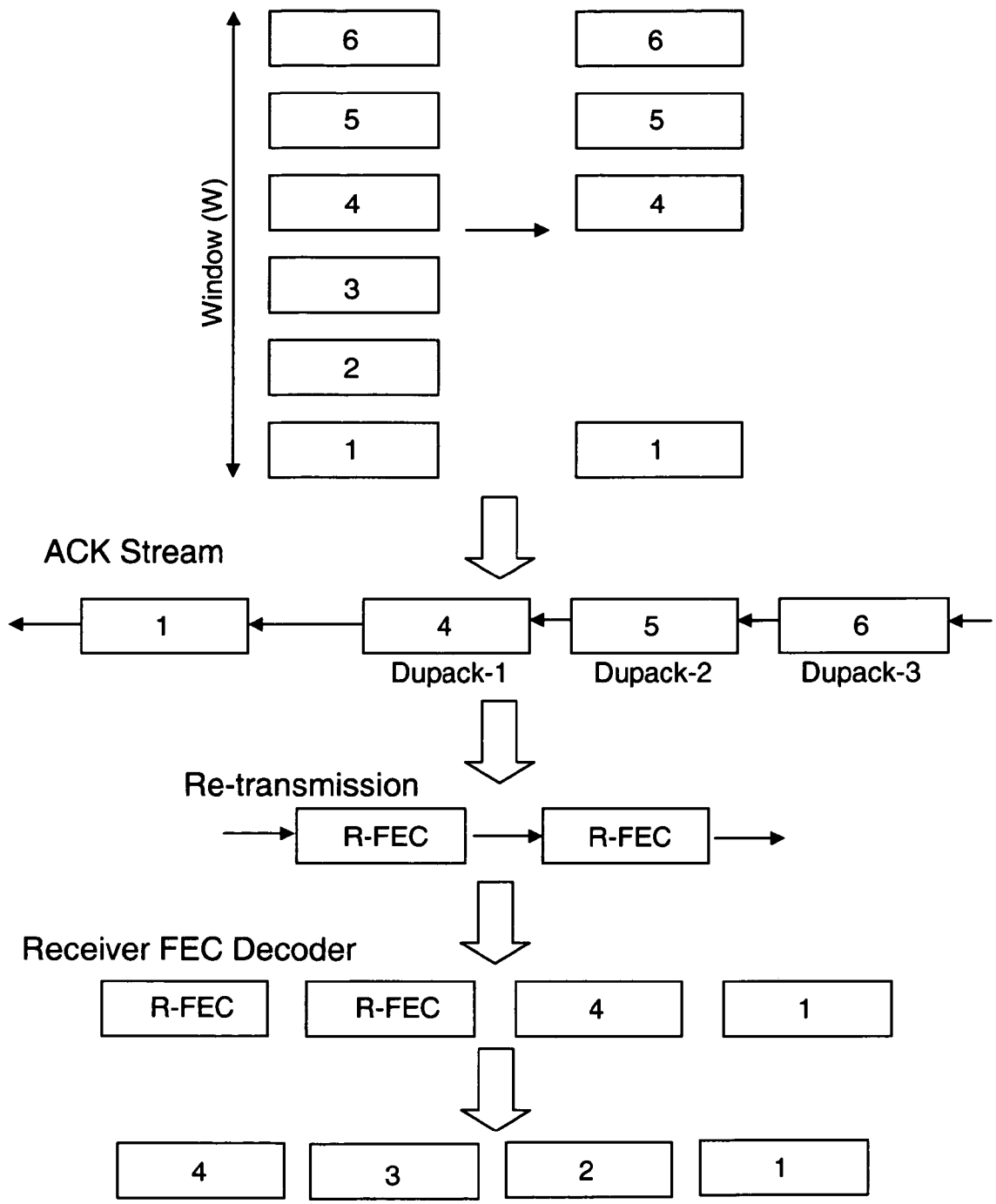
FIG. 10 illustrates an example in which reactive FEC data packets may be used to re-transmit data to a receiver in which one or more illustrative embodiments of the invention may be implemented.

FIG. 10 illustrates an example in which reactive FEC packets may be used in the transmission of data to a receiver. In this example, a window (W) of data packets contains six data packets (data packets 1-6). During transmission of the window of data packets, data packets 2 and 3 are lost (in this example). The receiver receives data packet 1 from the transmitter and acknowledges receipt of the data packet by returning an ACK corresponding to data packet 1. However, data packets 2 and 3 are not successfully received at the receiver. Therefore, the receiver does not return an ACK in acknowledgement of data packets 2 or 3. Instead, the receiver returns dupacks for subsequently transmitted (and received) data packets, such as 4, 5 and 6.

In response to receiving dupacks from the receiver, the transmitter transmits reactive FEC packets to reconstruct the lost data packets (i.e, data packets 2 and 3 in this example). As illustrated in FIG. 10, two reactive FEC packets are transmitted from the sender or transmitter to the receiver. The receiver may receive the reactive FEC packets which may be used at the receiver to reconstruct data packets 2 and 3. As shown in FIG. 10, the receiver uses the reactive FEC packets for reconstruction of data packets 2 and 3 to obtain all of the transmitted data packets (illustrated as data packets 1-4 in FIG. 10). The ability to use the reactive FEC packets to repair the loss of any of the lost packets enables efficient recovery.

Thus, in one example of the present invention, LT-TCP may respond to congestion in a communication network by altering the sending rate when an indication is received that the network is congested. In one example, the network congestion is indicated based on the state of the queue in which an Explicit Congestion Notification (ECN) is generated by the network and inserted into a data packet (e.g., in the header of the data packet) to mark the data packet. The marking may be accomplished, for example, by routers in the network. In this case, the transport protocol may respond to the congestion because it receives an unambiguous indication of congestion through the ECN marks. Conversely, if there are lost data packets but no ECN indications received at the receiver, the loss of data packets is not due to congestion. Therefore, LT-TCP does not respond to congestion but instead treats the packet losses as being due to errors in the network.

When the transport protocol identifies congestion in the network (e.g., an ECN indication is present), the transport protocol may further adjust or adapt the MSS. In one example, the transport protocol adapts the MSS by reducing the MSS to thereby increase the window granularity. For example, the MSS may be decreased by some factor (e.g., factor "f"), for example, between 0% and 100%. In another example, the factor "f" is 50% such that MSS is decreased by ½.

The transport protocol may respond to packet loss/erasure by providing proactive FEC packets. The FEC packets increase reliability and may be provided in anticipation of losses in a window. The FEC packets thus provide an "insurance" against packet loss. The number of proactive FEC packets may be based on an adaptive estimate of erasure rate. For example, the transport protocol may estimate an erasure rate per window of data packets. Based on the estimated data packet erasure rate per window, the transport protocol may adjust the MSS to allow proactive FEC data packets while maintaining sufficient window granulation.

The erasure rate may be estimated in a variety of ways. In one example, an estimate of the packet erasure rate may be determined based on an exponential weighted moving average (EWMA). For example, the EWMA parameters may be adaptively biased toward higher erasure rates. For example, if $N$=new measured erasure rate;

$\alpha=(N)/(N*E)$;

$\beta=1-\alpha=(E)/(N+E)$, then the estimated erasure rate may be determined in this example through an averaging process as follows:

$E$=estimated erasure rate=$\alpha*N+\beta*E$

In another example, values of $\alpha$ and $\beta$ may be constant (i.e., no bias). For example, in another example, $\alpha$ and $\beta$ may be set to a constant value such as 0.5.

A function is provided for mapping an estimate of a data packet erasure rate to a number of proactive FEC data packets to be added to the window of data packets for a window size in bytes. In this example, an estimate of an erasure rate is obtained, and the number of FEC packets in the next block may be computed based on the estimate. For example, given a certain window size in bytes (e.g., W) and the current estimated loss, these may be used to determine the amount of protection for the block. As one example to illustrate, if the estimated loss rate is 10%, then 10% of the packets are to be proactive FEC packets. The remaining packets are data packets. The sender may then determine the proactive FEC packets in bytes as equal to W* estimated erasure rate, where W is the window size in bytes. Also, the number of data packets may be determined as equal to W*(1−estimated erasure rate) resulting in a split between the bytes corresponding to data and bytes corresponding to proactive FEC in the block. Based on the number of bytes of data and FEC, respectively, the number of data packets or segments and proactive FEC packets or segments can be determined as the number of proactive FEC packets ("P") being the bytes of proactive FEC divided by the current MSS. The number of data packets or segments ("K") may be determined as the number of bytes of data divided by the current MSS. K+P make up the entire block of "N" packets.

Thus, in an example of the present invention, a window size is initially determined based on congestion control algorithms or mechanisms. This may be based on, for example the end-system's estimate of its fair share of the network capacity. The MSS may then be determined based on the window size and a desired (or minimum) window granularity. In addition, proactive FEC packets may be added to a number of data packets in the window. The number of proactive FEC packets added to the data packets in the window may be determined, for example, based on an estimated erasure rate. In addition, the MSS may be adapted or adjusted to accommodate the proactive FEC packets and to maintain a desired minimum window granularity given the window size. A window of packets may then be transmitted via the network to a receiver, the window of packets containing a number of data packets and a number of proactive FEC packets. In addition, a number of reactive FEC packets may also be provided based on the dynamic state as currently observed and/or the number of packet erasures observed in the last SACK received at the sender. For example, when the receiver decodes a block, it knows which packets made it through and which did not. Variables may be maintained that determine how many packets (data or FEC) are needed before this block can be completely decoded. This number may be fed back as the "hole size." The number of reactive FEC packets is determined by the 'hole sizes' in the ACKs. For example, the count of proactive FEC packets sent for the block, reactive FEC packets sent for the block and SACK retransmissions may be used to limit the number of reactive packets generated. Otherwise, the sender will send a certain number of reactive packets so that these will cover the holes for the estimated error rate.

Figure 11:
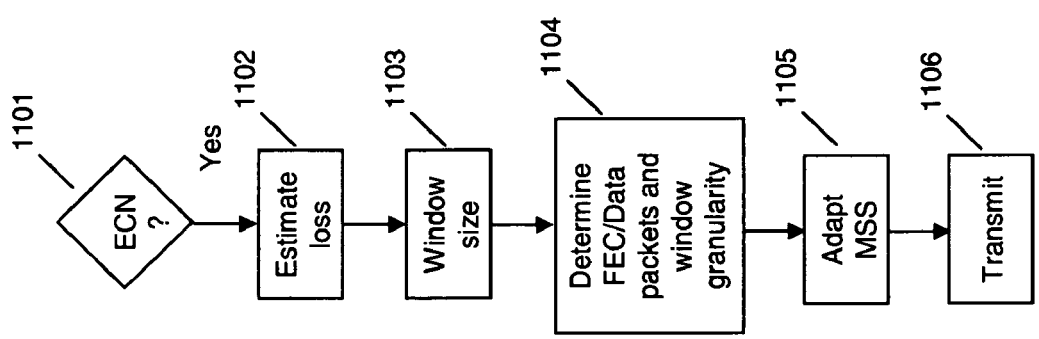
FIG. 11 is a flowchart illustrating an example of a method of transmitting data and/or FEC packets in a data block in which one or more illustrative embodiments of the invention may be implemented.

FIG. 11 is a flowchart illustrating an example of a method of transmitting data and/or FEC packets in a data block. In this example, an ECN signal is detected (STEP 1101). The ECN signal indicates that there is congestion in the network. In this example, MSS adaptation and FEC provisioning in each window may be achieved independently of ECN. For example, the window can increase when no ECN is received during MSS adaptation, proactive FEC provisioning, and/or reactive FEC response to dupacks. ECN signal may also cause a decrease in the window by a factor of ½, for example and/or a decrease in the MSS by a factor f. Therefore, the transport protocol processes the MSS and FEC packets based on the presence of congestion in the network. In STEP 1102, a loss estimate is determined. Also, the window size is obtained in STEP 1103. Based on the window size obtained in STEP 1103 and the loss estimate determined in STEP 1102, a number and/or proportion of proactive FEC packets is determined. This number of proactive FEC packets may be determined in relation to the number of data packets based on, for example, the loss estimate obtained in STEP 1102. The loss estimate obtained in STEP 1102 may also be used to determine window granulation. The window size obtained in step 1103 and the loss estimate obtained in STEP 1102 may also be used to determine a window granulation (i.e., the number of packets or segments in the window) (STEP 1104). Based on the loss estimate, the window size and window granulation, the MSS may be adapted (STEP 1105). The data window is transmitted in the network (STEP 1106) at the determined window granularity and containing the calculated ratio of proactive FEC packets to data packets.

In another example of the present invention as illustrated in FIG. 12, a block of packets is created. In this example, a loss-estimate is initially set to "0" (STEP 1201) and a window is initially set with a minimum window granularity ("G") (STEP 1202). The loss-estimate may be subsequently adjusted accordingly when an ACK is received. G describes the minimum number of packets or segments in the window and may be set to any value. In one example, G is set to 10. Each of the at least G packets or segments in the window may contain a number of bytes which may be between a minimum ("minmss") and a maximum ("mssmax") number. In one example, minmss is 200 bytes and max mss is 1500 bytes. Also, a parameter for the block number ("blocknumber") is initially set to "1" to indicate the first block (STEP 1203). The blocknumber parameter is incremented for subsequent blocks.

In this example, the block size of the current block is set to the size of the window ("W") (STEP 1204). Hence, the window size ("W") is used as a guide to determine the block size. In one example, W is greater than equal to 2000 bytes. The number of packets or segments within the block is "N" (i.e., the total number of packets in the block). These N packets in the block are split into a number of data packets ("K") and a number of proactive FEC packets ("P") (STEP 1205). The number of proactive FEC packets ("P") may be based on the estimated loss relative to the number of data packets ("K") in the block. As one example, if the loss is estimated to be 10%, then the number of proactive FEC packets ("P") is set to about 10% of the total number of packets or segments. In one example, the initial estimate for proactive FEC packets is 50%. In this example, the first block may have 5 proactive FEC packets and 5 data packets for a total number of 10 packets with an initial conservative estimated loss rate of 50% (loss estimate is equal to the % of Proactive FEC packets in this example). In this example, unused proactive FEC packets may be considered "overhead". The overhead may be reduced with subsequent loss-estimates.

The N packets in the block (including K data packets and P proactive FEC packets) are transmitted through the network (STEP 1206). After transmission of the block, the values for K and P for the next block are determined (STEP 1207) based on the current value of loss-estimate and the window size W. When an ACK is received from the receiver, the sender updates the loss estimate accordingly (STEP 1208). This process may continue until the connection is terminated.

Block sizes may be determined by the current window size. After transmission of a block is completed, the next block is created. In one illustrative example, if the window slides (upon reception of ACKs) to allow the transmission of a packet not in any block, this triggers the formation of a new block. This may occur even if the current block is transmitted. In one example, if a packet/segment is retransmitted, the retransmitted packet/segment is still assigned to the same block number as it was originally assigned. The state of blocks may be further maintained in a state table. Thus, a state table may be searched to obtain information on the state of any number of blocks.

A sender may operate in any number of modes. For example, a sender may operate in a data mode in which data packets are transmitted in the block. Also, the sender may operate in a proactive FEC (PFEC) mode in which once K data packets are transmitted, the sender may transmit proactive FEC (PFEC) packets. After K+P packets are sent, a next block is made. If a timeout or retransmission occurs, the system may freeze the state of the current block while older packets/segments are sent to ensure that the right packet/segment is sent. Then the count for the current block is not incremented. In addition, the sender may implement fast recovery when a third dupack is received. If duplicate ACKs are received, the sender may send a reactive FEC packet. In this example, the ACKS may contain hole sizes for different blocks—the block corresponding to the packet received last by the receiver and the block corresponding to the ACK number in the ACK field (could be an older block). The hole is the number of packets/segments still needed at the receiver to fully reconstruct a block. The sender may send reactive FEC packets in response to hole size information fed back to the sender.

In an example of adjusting the window granularity, variables are established corresponding to a temporary size of packets (i.e., "tmpsize") and a maximum value for MSS (i.e., "maxmss"). FIG. 13 is a flowchart illustrating one example of obtaining or adjusting window granularity. In this example, the congestion window is obtained in bytes (e.g., "wndinbytes") (STEP 1210). The number of segments or packets accommodated in the window ("tmpsegs") is determined as the congestion window in bytes ("wndinbytes") divided by the temporary size of packets ("tmpsize") (STEP 1211). The tmpsize is compared to the minimum window granularity ("G"). If the tmpsize is less than or equal to the minimum window granularity (YES branch of step 1212), then the tmpsize is decreased (STEP 1214) and tmpsegs is recalculated with the updated tmpsize (STEP 1215). When tmpsize becomes less than or equal to G (NO of step 1212), then the values for tmpsize and tmpsegs are output (STEP 1213) as the size of segments and the number of segments, respectively.

FIG. 14 is a flowchart illustrating another example of obtaining or adjusting window granularity. In this example of adjusting the window granularity, the tmpsize variable is set to the current MSS value (STEP 1220). Tmpsegs is determined as the congestion window in bytes ("wndinbyte") divided by tmpsize (STEP 1221). The value of tmpsize is then incremented by "stepvalue," (STEP 1222) which describes the number of bytes by which the MSS value can be increased in one pass. In one example, stepvalue is equal to about 200 bytes. The value of tmpsegs is then recalculated with the updated tmpsize value (STEP 1223). If the number of segments (tmpsegs) is less than or equal to the minimum window granularity (G) ("YES" branch of STEP 1224) and the packet/segment size (tmpsize) is less than or equal to a maximum value for MSS ("maxmss") ("YES" branch of STEP 1225), then the MSS is set to tmpsize and the number of packets or segments in the window is set to tmpsegs (STEP 1227). Otherwise ("NO" branch of either STEP 1224 or STEP 1225), the MSS and the number of packets or segments in the window is not updated (STEP 1226).

In another example of window increase behavior, an ECN is received (indicating the presence of congestion) and the packet/segment size is reduced accordingly. However, if the packet size becomes less than a minimum value for MSS ("MIN_MSS"), then the window size (in segments) is cut instead subject to a minimum window granularity. For example, the window size in bytes may be cut upon reception of the first ECN in a window. In this example, the MSS adaptation policies affect the window size in units of segments but may not affect the bytes. During window increase, the window size in bytes may be determined and compared to a predetermined threshold in bytes to determine if the process is in slowstart. In one example, after a timeout, the window is resized to 10 packets of 200 bytes. In another example, when an ECN is received, the window size in bytes may be cut in half which may be accomplished by cutting the packet size by half or the number of segments by half.

FIG. 15 is a flowchart illustrating an example of the transmission of reactive FEC packets. In this example, a sender receives an ACK which may be a dupack from a receiver (STEP 1230). A hole size for the current block and for the last block in which a corresponding ACK was received may be determined. These values may be updated in a state machine in the sender. If a dupack is received (STEP 1230), a reactive packet FEC packet may be sent (STEP 1234). In the transmission of a reactive FEC packet, a count of the number of proactive FECs, reactive FECs and/or SACK packets sent from the block is obtained (STEP 1231). The expected number of FEC or retransmissions may be calculated (STEP 1232). The number of reactive packets to be sent from the current block may be determined (STEP 1237) from various factors. For example, the number of reactive packets to be transmitted from the block may be based on the number of proactive FEC packets expected to reach the receiver. In this example, the number of proactive packets expected to reach the receiver may be estimated by subtracting a loss estimate from one and multiplying by the number of proactive FEC packets sent from the block to obtain a "backed-off" PFEC value. The backed-off PFEC value may further be used to determine the number of reactive FEC packets to be sent from the current block.

In another example, the number of reactive FEC packets may be based on the number of retransmissions expected to reach the receiver, i.e., the number of "backed-off" retransmits. In this example, the number of retransmissions expected to reach the receiver may be estimated by determining a loss estimate, subtracting the loss estimate from 1 and multiplying by the number of retransmissions sent. Hence, the number of reactive FEC packets to send from the current block may be estimated based on a function of any of a variety of variables such as but not limited to the backed-off PFEC, the backed-off retransmits, or any one or combination of other variables such as the total number of packets in a block, the number of data packets in the block, the number of proactive FEC packets in a block, or the number of reactive packets sent from the block.

If the total number of reactive FECs ("R") is less than or equal to the number of reactive FEC packets to be sent from the block ("YES" branch of STEP 1233), then a reactive packet is sent from the current block (STEP 1234) and the number of reactive FEC packets sent from the current block is updated in view of the loss rate (STEP 1235). Thus, the expected number of FEC and retransmissions that have reached the receiver is calculated.

Each ACK received from the receiver may contain information on the hole sizes of a block corresponding to the current incoming packet (the "current" block) and a block corresponding to the block for which the cumulative ACK is being sent (the "last" block). As one example, a receiver awaits packet number 212 from block 10. block 11 has been fully decoded and packet number 243 from block 12 is the next packet. The hole size for block 10 is 2, for example, and the hole size for block 12 is 0, for example. Thus, in this example, the ACK from the receiver contains information on the hole size of 2 for block 10 and the hole size of 0 for block 12.

When the sender receives the ACK, it may check a "phase3 flag" in the packet which is set on all reactive FEC packets from the sender. The Phase 3 flag may be set in the header and may be echoed back and trigger further reactive FEC packets. When the sender identifies the phase3 flag, the sender sends a reactive FEC packet. This ensures a steady stream of packets. When a dupack is detected, reactive FEC packets may be sent from the "current" block and the "last" block as needed, based on the indication in the SACK-based acknowledgements received at the sender. The number of react packets thus sent is determined based on various factors. For example, the sender may first estimate the number of proactive FEC packets expected to have reached the receiver. This value may be set to 0 or may be determined using the loss estimate (e.g., expected proactive FECs=(1−loss rate)*pfec_sent).

The sender may know the number of SACK retransmissions received so far, the number of reactive FEC packets sent so far from the block, and the hole size for the block. The hole size may be cumulative (i.e., may not decrease) to avoid accounting for holes filled by retransmissions or hole sizes that increase or decrease. Once the SACK retransmissions and PFEC packets are "backed off", the sender sends enough react packets to fill the hole size. This may also account for the loss estimate. For example, if after backing off, 5 holes have to be filled and the loss estimate is 50%, then 10 packets will be sent. Thus, the receiver may know the number of retransmissions and original transmission it has received. In another example, the receiver may know the number of retransmissions sent from the sender.

Figure 16:
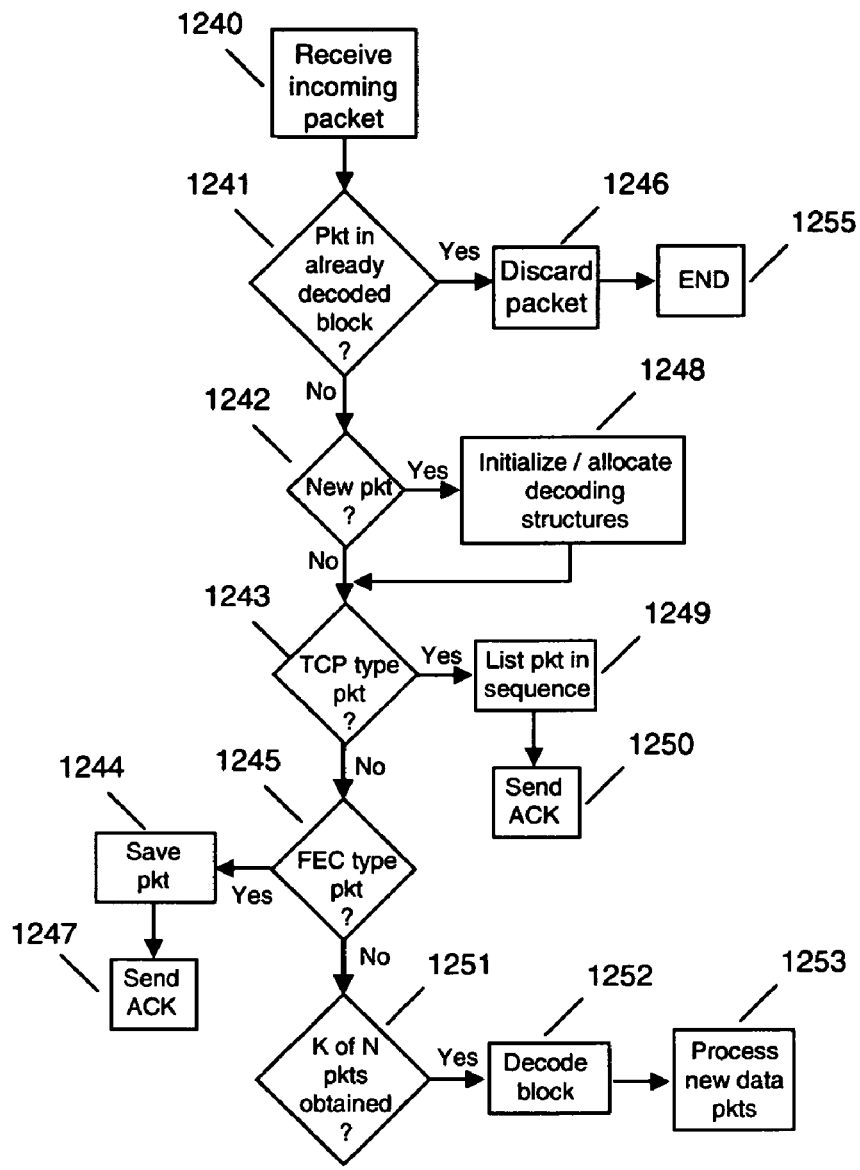
FIG. 16 is a flowchart illustrating an example of a method of decoding at a receiver in which one or more illustrative embodiments of the invention may be implemented.

FIG. 16 is a flowchart illustrating an example of a method of decoding at a receiver in the present invention. In this example, an incoming packet (STEP 1240) belonging to a block is discarded (STEP 1246) and the process terminated (STEP 1255) if the incoming packet is for a block already decoded ("YES" branch of STEP 1241). If the packet belongs to an as yet undecoded block ("NO" branch of STEP 1241), then the structures for the block are initialized and allocated (STEP 1248) if the block has not been seen before ("YES" branch of STEP 1242). The incoming packet may be processed based on the type of packet. If the packet is a TCP type packet ("YES" branch of STEP 1243), then the packet is inserted into a list of packets for the block and the list of packets is maintained in sequence (STEP 1249). An ACK for the TCP packet is then sent/received (STEP 1250). If the packet is a FEC type packet ("YES" branch of step 1245), then the packet is saved along with other packets from the block for decoding (STEP 1244) and an ACK is sent for the FEC packet received (STEP 1247). If K out of N packets from the block have been obtained ("YES" branch of STEP 1251), then the entire block is decoded (STEP 1252) which may also reconstruct any missing packets with FEC packets received for that block. The new data packets may be further processed according to the transport protocol (STEP 1253). Thus, in this example, an ACK for the FEC packet indicates that the ACK for the last data packet is sent since FEC packets in this example do not have sequence numbers.

In the following example, a loss estimate is determined. In this example, a first proactive FEC packet is received and sample loss estimate is used to update the average loss estimate. One example of determining the loss sample for each block includes obtaining the total number of packets in the block and the total number of original transmissions that are present in the receiver decoding block (may be obtained by walking the list and checking the orig_trans flag in the header). The number of lost packets is determined as the total number of packets minus the number of original packets. The loss sample may be determined as the number of lost packets divided by the total number of original transmissions present in the receiver decoding block. The new loss estimate is determined using the EWMA equation where $\alpha$ and $\beta$=0.5. The loss estimate may then be echoed back in the ACKS from the receiver to the sender.

In the following example, hole size for blocks is determined. In this example, an packet is received and a number of packets that should have come in for the corresponding block is determined. As one example, if the block starts at 100 and the highest packet in the block is 105, then 6 packets should have been received in the block. In one example, the number of packets in the original transmission may be counted. In an alternative example, the number of packets in the block, including the original transmission and retransmission, is determined. In this example, the hole size is determined based on the difference between the 2 numbers. The hole size is stored in the receiver decoding structure and the structure is accessed and the hole sizes for the last and current blocks may be added to the ACK. This determination also applies to FEC packets however, the total number of packets is the same. For example, the sender may start with a window of 10 and follow the basic self-clocking behavior for data and proactive FEC packets. In another example, the hole size is not the difference between the original and retransmitted packets such that if the block starts at 100 and we have 100, 102 and 103 which are original transmissions, and we have received 109 and 110, of which 109 was a retransmission and 110 was original, we have a hole size of 5 packets (104-108). In one example, the retransmitted packet 109 is ignored and the hole size is 6. By ignoring the retransmitted packet, we inflate the hole size to send more react packets.

The following is another example of a sender proactive FEC algorithm where G is the minimum window granularity, $MSS_{MAX}$ is the maximum MSS allowed, $new_1$ is the new measured erasure rate, P is the number of PFEC packets in the block, MSS1 is a temporary variable, $MSS_{MIN}$ is the minimum MSS allowed, MSS is the current MSS used, E is the Average erasure rate estimate, R is the number of RFEC packets in the block and W is the congestion window in packets.

```
P=f(E)
MSS_1 = (W*MSS*E)/P
IF (MSS_1 < MSS_MIN)
    W = (W*MSS)/ MSS_MIN
    MSS= MSS_MIN
    IF((W*E) < 1)
        R=1
    ELSE
        R = W*E
ELSE
    IF(MSS_1 > MSS_MAX)
        IF (W/MSSMAZ>G)
            W=(W*MSS)/ MSS_MAX
            MSS= MSS_MAX
            R=W*E
        ELSE
            W=G
            MSS=W/G
            R=W*E
    ELSE
        IF(W/MSS_1>G
            W=(W*MSS)/MSS_1
            MSS=MSS_1
            R=P
        ELSE
            W=G
            MSS=W/G
            R=W*E
```

The following is an example of a receiver FEC decoder method:

```
IF(Data Packet)
    IF (Next in Sequence)
        IF (No Previous Unprocessed Saved Packets in the Block)
            Process SACK Packet
        ELSE
            IF (Packet in Current Block) AND (Lost Packets <P))
                Save the packet
            ELSE
                Process all Saved SACK Packets
    ELSE
        IF ((Packet in Current Block) AND (Lost Packets <P))
            Save the Packet
        ELSE
            Process all Saved SACK Packets
ELSE //Redundancy Packet
    IF(Any Saved Packets)
        IF ((Packet in Current Block) AND (Lost Packets <P))
            Recover and Process all SACK Packets
        ELSE
            IF ((Last Packet in Block) OR (Packet in a New Block))
                Process all Saved SACK Packets
            ELSE
```

Save the Packet

The present invention includes any novel feature or combination of features disclosed herein either explicitly or any generalization thereof. While the invention has been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

What is claimed:

1. A method of transmitting a data block containing a data window of a number of packets, the method comprising:
    setting a loss estimate value;
    setting the number of packets in the data window to a first number of packets corresponding to a window granularity, wherein each packet contains a first number of bytes;
    setting a block size of the data block to a window size, wherein the number of packets in the block is N;
    splitting the N packets in the data block into a first group of data packets and a second group of proactive forward error control (FEC) packets based on the loss estimate value;
    transmitting the data block, wherein the data block contains the first group of data packets and the second group of proactive FEC packets;
    searching a state table to obtain information on a state of the data block;
    updating the loss estimate value and recalculating the number of data packets and a number of proactive FEC packets based on the updated loss estimate value and the window size; and
    transmitting a second data block comprising the recalculated number of data packets and the recalculated number of proactive FEC packets;
    wherein the number of proactive FEC packets for the data window is based on an estimated packet loss rate.

2. The method of claim 1, wherein the loss estimate value is determined by receiving a signal comprising a loss estimate parameter, wherein the loss estimate value is based on the loss estimate parameter, and wherein a ratio of the number of proactive FEC packets to the number of packets in the data block is adjusted based on the estimated packet loss rate.

3. The method of claim 1, wherein the window granularity is a minimum window granularity.

4. The method of claim 1, wherein the packet loss rate is determined by applying an exponential weighted moving average.

5. The method of claim 1, wherein the packet size is decreased in response to receiving a congestion notification.

6. The method of claim 1, wherein N is determined based on a determined packet size.

7. The method of claim 6, wherein N is further determined based on the window size.

8. The method of claim 1, wherein the number of proactive FEC packets is substantially equal to the estimated packet loss rate.

9. The method of claim 1, further comprising adjusting window granularity of the data window.

10. The method of claim 9, wherein adjusting window granularity comprises adjusting the size of the packets in the data window.

11. The method of claim 9, wherein adjusting window granularity is based on the number of proactive FEC packets in the data window.

* * * * *